United States Patent [19]
Stephens

[11] Patent Number: 4,588,171
[45] Date of Patent: May 13, 1986

[54] SHOCK ABSORBER AND AIR SPRING ASSEMBLY

[75] Inventor: Robert K. Stephens, Brookfield, Wis.

[73] Assignee: Applied Power Inc., Milwaukee, Wis.

[21] Appl. No.: 332,189

[22] Filed: Dec. 18, 1981

[51] Int. Cl.⁴ ............................................... F16F 9/04
[52] U.S. Cl. .................................. 267/64.24; 188/318
[58] Field of Search ............... 267/8 R, 64.15, 64.16, 267/64.18, 64.19, 64.21, 64.22, 64.23, 64.24–64.28, 11 R, 15 A, 15 R, 14, 12; 188/280, 281, 282, 284, 285, 286, 287, 313, 314, 315, 316, 317, 318, 319, 322.11–322.22, 321.11, 298; 280/702–714, 693; 180/89.14, 89.15

[56] References Cited

U.S. PATENT DOCUMENTS

| | | | |
|---|---|---|---|
| 1,295,065 | 2/1919 | Riley et al. | 188/287 |
| 1,494,135 | 5/1924 | Robinson et al. | 188/287 |
| 2,048,037 | 7/1936 | Smith | 188/318 X |
| 2,173,574 | 9/1939 | Binder et al. | 188/287 |
| 2,332,161 | 10/1943 | McIntyre et al. | 188/287 |
| 2,360,755 | 10/1944 | Boor | 188/286 |
| 2,536,626 | 1/1951 | Coleman | 267/64.23 |
| 2,893,104 | 7/1959 | Hancock | 267/15 R |
| 2,980,441 | 4/1961 | Timpner et al. | 280/693 |
| 3,063,701 | 11/1962 | Long, Jr. | 267/64.24 |
| 3,213,973 | 10/1965 | Damon | 188/287 |
| 3,391,922 | 7/1968 | Axthammer | 267/64.23 X |
| 3,991,863 | 11/1976 | Lee | 188/318 X |
| 4,067,558 | 1/1978 | Keijzer et al. | 267/8 R X |
| 4,105,193 | 8/1978 | Long, Jr. | 188/315 X |
| 4,226,408 | 10/1980 | Tomita et al. | 267/64.23 X |

FOREIGN PATENT DOCUMENTS

| | | | |
|---|---|---|---|
| 7087 | 3/1907 | France | 188/318 |
| 595592 | 10/1925 | France | 188/317 |

*Primary Examiner*—Douglas C. Butler
*Attorney, Agent, or Firm*—John J. Byrne; Bradford E. Kile; Kevin M. O'Brien

[57] ABSTRACT

A shock absorber and air spring assembly particularly adapted for use in a tilt cab suspension system. It provides the capability of remotely adjusting the amount of damping on the down stroke of the damper piston.

7 Claims, 4 Drawing Figures

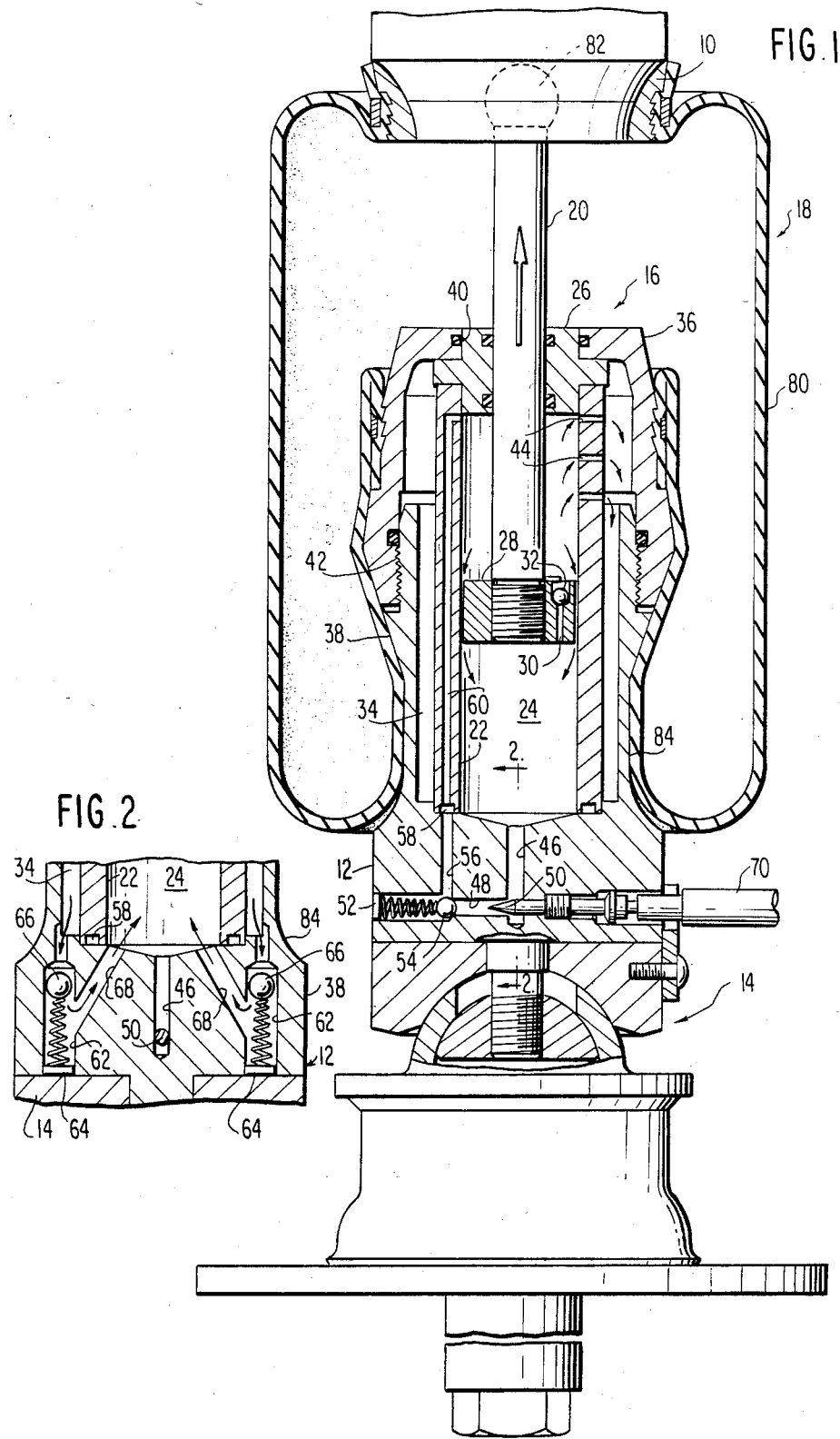

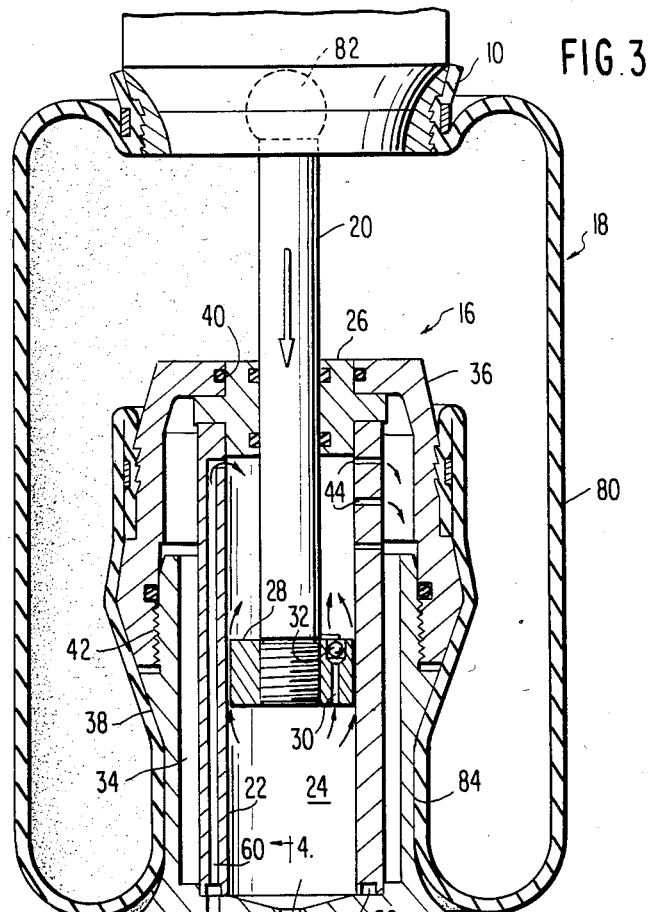
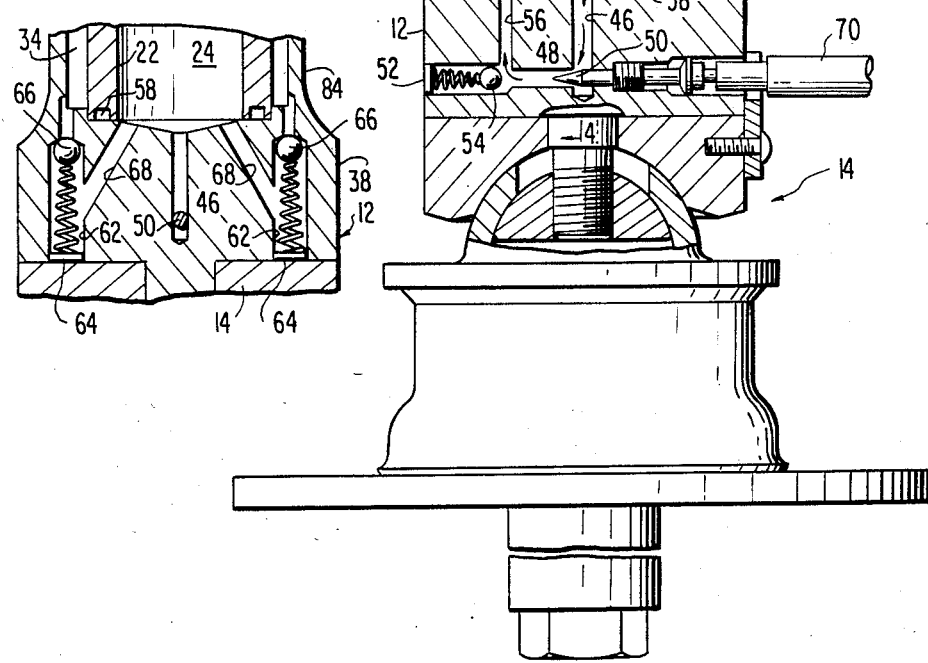

SHOCK ABSORBER AND AIR SPRING ASSEMBLY

TECHNICAL FIELD

This invention relates to shock absorbers and spring assemblies particularly adapted for use in tilt cab trucks.

CROSS REFERENCE TO RELATED APPLICATIONS

This application discloses and claims a device similar to the device disclosed and claimed in commonly assigned U.S. patent application Ser. No. 06/339305, filed Jan. 15, 1982 now U.S. Pat. No. 4,445,673 and U.S. patent application Ser. No. 06/348,133, filed Feb. 11, 1982 now U.S. Pat. No. 4,502,673.

BRIEF SUMMARY OF THE INVENTION

The shock absorber and spring assembly of this invention provides the capability of remotely adjusting the amount of damping on the down stroke of the damper piston. In the downstroke mode there are three paths for hydraulic fluid to transfer from the chamber below the piston to the chamber above the piston. A relatively small amount of hydraulic fluid leaks around the piston. A portion of the hydraulic fluid flows through a restricted one-way orifice in the piston. The remaining hydraulic fluid is forced past a remotely adjustable orifice in the base of the damper, past a one-way valve, and is deposited in the chamber above the piston. The orifice in the piston is optional. If used, it fixes the maximum amount of downstroke damping obtainable.

BRIEF DESCRIPTION OF THE DRAWINGS

FIG. 1 is a cross-sectional view of a shock absorber and air spring assembly according to the invention in the upstroke mode.

FIG. 2 is a view along the line 2—2 in FIG. 1.

FIG. 3 is a cross-sectional view similar to FIG. 1, but in the downstroke mode.

FIG. 4 is a view along the line 4—4 in FIG. 3.

DETAILED DESCRIPTION OF THE PRESENTLY PREFERRED EMBODIMENT

The shock absorber and air spring assembly shown in the drawings comprises a first base 10 adapted to be attached to a cab member (not shown), a second base 12 adapted to be attached to a cab latch mechanism 14, a shock absorber sub-assembly 16, and an air spring subassembly 18. The cab latch mechanism 14 shown in the drawings is the cab latch mechanism described and claimed in commonly assigned U.S. patent application Ser. No. 06/348141, filed Feb. 11, 1982 now U.S. Pat. No. 4,429,759, but of course the subject shock absorber and air spring assembly can be attached to any other appropriate cab latch mechanism.

THE SHOCK ABSORBER SUB-ASSEMBLY 16

The shock absorber sub-assembly 16 comprises a rod 20 projecting from the first base 10, a cylinder 22 projecting from the second base 12 and containing a bore 24 closed at the end remote from the second base 12 by a cap 26 through which the rod 20 slidingly projects, and a piston 28 carried by the rod 20 within the bore 24. The piston 28 is not in sealing contact with the bore 24, but permits a small amount of restricted flow in either direction, as indicated by the arrows in FIGS. 1 and 3. In addition, a conduit 30 leads through the piston 28. The conduit 30 contains a one-way valve 32 which permits flow from beneath the piston 28 to above the piston 28, but prevents flow in the opposite direction.

An annular reservoir 34 is contained in the second base 12 surrounding the cylinder 22. The second base 12 comprises an upper component 36 and a lower component 38. The upper component 36 is a cup-shaped member which has an axial bore 40 which receives the cap 26. The upper component 36 is threadedly mounted on the lower component 38 at 42 so that the lower component 38 and the cylinder 22 can be removed separately for maintenance without disturbing the air spring sub-assembly 18. The reservoir 34 extends into both the upper component 36 and the lower component 38.

A plurality of axially spaced conduits 44 lead from the bore 24 near the cap 26 to the reservoir 34. The purpose of having a plurality of axially spaced conduits 44 is to affect the reaction characteristics of the shock absorber sub-assembly 16. When the piston 28 begins an upward stroke, all of the conduits 44 are unobstructed, and the flow of hydraulic fluid out the conduits 44 is relatively free. However, towards the end of an upward stroke, the lower conduits 44 are obstructed by the piston 28, and the flow of the hydraulic fluid becomes much more restricted. Moreover, it will be noted that the uppermost conduit 44 is spaced from the cap 26. Accordingly, incompressible hydraulic fluid will be trapped in the bore 24 above the piston 28 when the piston 28 cuts off the uppermost conduit 44, except for the severely restricted clearance around the piston 28. This configuration greatly slows upward travel of the piston 28 at the end of its stroke and prevents contact between the piston 28 and the cap 26 in all but the most extreme cases.

A blind axial bore 46 extends vertically from the face of the second base 12 which defines the bottom of the bore 24. The axial bore 46 communicates with a stepped radial bore 48 which contains a needle valve 50 discribed hereinafter. The radial bore 48 is plugged at 52 and contains a one-way valve 54 which permits flow of hydraulic fluid from the bore 24 beneath the piston 28 to the bore 24 above the piston 28, but prevents flow in the other direction. The radial bore 48 in turn communicates with a longitudinal blind bore 56 which extends vertically to the face of the second base 12. There the longitudinal bore 56 communicates with an annular groove 58 in the end of the cylinder 22 which abuts the second base 12. The purpose of the annular groove 58 is to make the angular orientation of the cylinder 22 relative to the second base 12 irrelevant. The annular groove 58 in turn communicates with a longitudinal conduit 60 in the cylinder 22 which extends nearly the length of the cylinder 22 and which communicates with the bore 24 adjacent the cap 26.

Turning to FIGS. 2 and 4, it will be seen that the reservoir 34 also communicates with two stepped bores 62 which are plugged at 64 and which contain one-way valves 66. Angled bores 68 provides communication between the stepped bores 62 and the lower face of the bore 24, and the one-way valves 66 permit flow from the reservoir 34 through the stepped bores 62 and the angled bores 68 to the bore 24, but prevent flows in the opposite direction.

Returning to the needle valve 48 (shown in FIGS. 1 and 3), it will be seen that it partially obstructs the radial bore 48. However, its position in the radial bore 48 is under the control of the operator of the truck via a cable 70, which permits the operator of the truck to control the damping rate of the suspension device.

THE AIR SPRING SUB-ASSEMBLY 18

The air spring sub-assembly 18 comprises an air bag 80 surrounding the rod 20 and the cylinder 22. A conduit (not shown) communicates air under pressure to and from the air bag 80. The air bag 80 is connected at its upper end to the first base 10 and at its lower end to the upper component 36 of the second base 12. Alternatively, the air bag 80 could be connected at its lower end to the base 38 beneath the reservoir 34, but the illustrated configuration facilitates disassembly for maintenance.

Since the subject shock absorber and air spring assembly is particularly well adapted for use on a tilt cab truck, the rod 20 is mounted on the first base 10 by means of a universal joint 82. However, it will be appreciated that, if the assembly is used in a context where the first base 10 and the second base 12 move only vertically relative to each other, the universal joint 82 can be dispensed with.

The lower component 38 of the second base 12 is formed with an external neck 84 adjacent to the air bag 80, and the air bag 80 is designed so that, when it expands, it expands into the neck 84. This construction provides the proper rolling surface for the air bag 80. The geometry of the neck 84 can be altered to control the spring characteristics of the air bag 80.

OPERATION OF THE SHOCK ABSORBER AND AIR SPRING ASSEMBLY

When a truck incorporating the subject shock absorber and air spring assembly is travelling over the road, the air bag 80 is inflated. A separate levelling valve controls the mean position of the piston 28.

When an unevenness in the road causes the piston 28 to move upwardly in the bore 24 (as shown in FIGS. 1 and 2), the one-way valve 32 in the conduit 30 and the one-way valve 54 in the stepped bore 48 are closed by hydraulic pressure. Some hydraulic fluid leaks around the piston 28, but most of the hydraulic fluid above the piston 28 exits the bore 24 to the reservoir 34 through the conduits 44. From the reservoir 34, the hydraulic fluid flows through the bores 62 (unseating the one-way valves 66) and the bores 68 to the bore 24 beneath the piston 28.

When an unevenness in the road causes the piston 28 to move downwardly in the bore 24 (as shown in FIGS. 3 and 4), the one-way valves 66 are closed by hydraulic pressure, but the one-way valves 32 and 54 are opened. Thus, hydraulic fluid from the bore 24 beneath the piston 28 flows upwardly through the conduit 30 (as well as around the piston 28) to the bore 24 above the piston 28 and downwardly through the bore 46, the bore 48, around the needle valve 50, past the open one-way valve 54, and up through the bore 56, the annular groove 58, and the conduit 60 to the bore 24 above the piston 28.

It should be noted that the cross-sectional area of the conduit 30 below the one-way valve 32 is preferably significantly smaller than the total cross-sectional areas of the conduits 44, so that the downward stroke of the piston 28 is initially much more damped than its upward stroke.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:

1. An integral shock absorber and spring assembly for remotely adjusting the amount of damping on a down stroke of the shock absorber comprising:
   (a) a first base;
   (b) a rod projecting from said first base;
   (c) a second base;
   (d) a cylinder projecting from said second base, said cylinder containing a first bore having a first end and a second end, the first end being closed by a cap through which said rod slidingly projects;
   (e) a piston carried by said rod within said first bore;
   (f) a reservoir for hydraulic fluid;
   (g) a first path of fluid communication from the first end of said first bore to said reservoir;
   (h) a second path of fluid communication from the second end of said first bore to the first end of said bore, said second path including,
      a first longitudinal bore in said second base in communication with said first bore,
      a radial bore in said second base in communication with said first longitudinal bore and said second base,
      a remotely adjustable flow control valve within said radial bore in said second base,
      a second longitudinal bore in said second base in communication with said radial bore,
      a one-way valve contained in said second longitudinal bore which permits fluid
      flow towards the first end of said first bore but prevents fluid flow in the opposite direction, and
      a conduit in said cylinder in fluid communication between said second longitudinal bore in said second base and said first bore on the first side of said piston; and
   (i) a spring surrounding said rod and said cylinder and being connected at one end to said first base and at the other end to one of said second base or said cylinder.

2. An assembly as recited in claim 1 wherein said spring is an air bag.

3. An assembly as recited in claims 1 wherein said first path of fluid communication comprises a plurality of axially spaced second radial conduits leading from the first end of said first bore to said reservoir, whereby the effective cross-sectional area of the sum of said second conduits is reduced as said piston nears one end of its stroke.

4. An assembly as recited in claim 1 wherein said rod is mounted on said first base by means of a universal joint.

5. An assembly as recited in claim 1 and further comprising:
   (a) a conduit through said piston; and
   (b) a one-way valve contained in said conduit through said piston which permits fluid flow towards the first end of said first bore but prevents it in the opposite direction.

6. An assembly as recited in claim 5 wherein said conduit through said pistons permits a slower flow rate than said first path of fluid communication.

7. An assembly as recited in claim 1 wherein:
(a) said spring is an air bag;
(b) said second base has an external neck adjacent to said air bag; and
(c) said air bag is designed so that, when it expands, it expands into said neck.

* * * * *